Dec. 10, 1940.      C. H. BROWN      2,224,214
LIGHT POLARIZING BODY
Filed Dec. 28, 1937

INVENTOR.
Charles H. Brown

Patented Dec. 10, 1940

2,224,214

UNITED STATES PATENT OFFICE 2,224,214

LIGHT POLARIZING BODY

Charles H. Brown, Brooklyn, N. Y., assignor, by mesne assignments, to Polaroid Corporation, Dover, Del., a corporation of Delaware Application December 28, 1937, Serial No. 182,039

4 Claims. (Cl. 88—65)

This invention is a continuation-in-part of my application Serial No. 150,495, filed June 26, 1937, and relates generally to light polarizing bodies. More particularly, the invention relates to a light polarizer having wires embedded therein.

Briefly stated, the light polarizing body of the present invention comprises an optical element having embedded therein a plurality of parallelly arranged electrically conducting wires.

A better understanding of the invention may be had by referring to the following description which is accompanied by a drawing, wherein.

Figure 1:
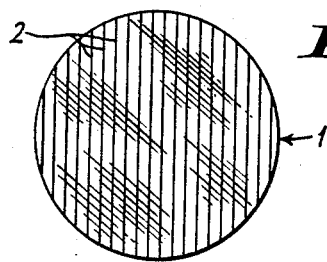
Fig. 1 shows the light polarizing body made in accordance with the principles of the invention. It should be understood that although the wires of this polarizing body are of such small diameter as to be substantially invisible, they have been greatly magnified and spaced apart in the drawing for the purpose of illustration.

Fig. 1 shows my new polarizing body consisting preferably of a glass plate 1 of any desired form having embedded therein extremely fine, parallelly arranged electrical conductors 2, such as fine platinum, although other electrical conducting materials, such as copper or silver, can also be used. These conductors should be continuous through the lens, extremely small in cross-section, and arranged about 40,000 or more to the inch, in order to provide extremely narrow transparent areas of substantially equal width between adjacent conducting elements. We thus have, in effect, a grating which exerts a polarizing action on light. The direction of polarization may be parallel to the wires, or at an angle thereto, depending upon the width of the apertures between adjacent wires and the wavelength of the transmitted light. It is preferred that there be at least 80,000 of such wires per inch lens, measured in a direction at right angles to the wires, although it will be appreciated that the number of wires can differ materially from those mentioned above without departing from the spirit and scope of the invention. Where there are 80,000 minute wires per inch, and where the transparent areas between adjacent wires are equal in diameter to the individual wires, it will be apparent that the wires and the areas between them are all less in diameter than the wave lengths of visible light. Under such circumstances each wire will have a diameter not exceeding .2 micron. Such a condition is preferred. It will be understood, moreover, that the length of each wire is preferably very much greater than its width. While it has been described as continuous, and while such a condition is preferred, it is not essential. The wires should, however, be substantially longer than the wave lengths of visible light. The character of polarization of light transmitted by structures embodying the invention may be controlled. For example, it has previously been observed that light which has passed through a narrow slit less than .1 micron in width was polarized perpendicular to the direction of the slit, whereas on widening the slit to the dimension of the light wave .5 micron, the direction of polarization turned through a right angle.

Figure 2:
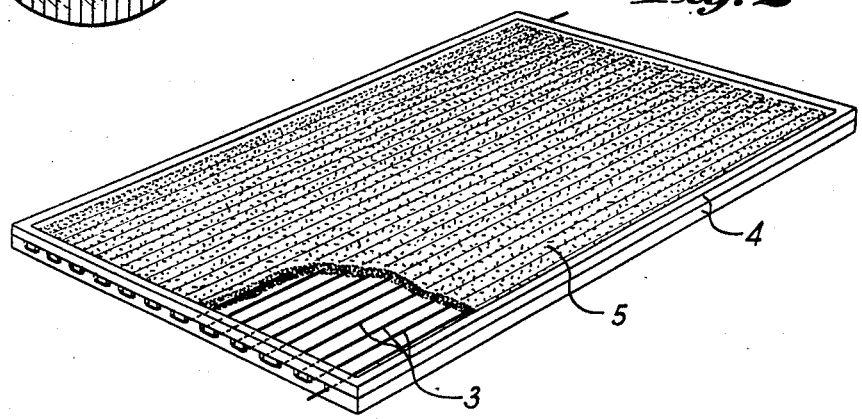
Figs. 2 and 3 illustrate very generally, and by way of example only, the apparatus which may be used in two different methods of manufacturing the polarizing body of Fig. 1.
Figure 2A:
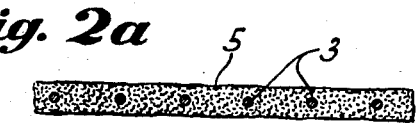
Fig. 2a is a fragmentary sectional view through the wires and powdered glass of Fig. 2.

One method of manufacturing such a polarizing body having embedded electrical conductors is illustrated in Fig. 2 and includes arranging a plurality of equally spaced thin metallic wires 3 in parallel on a suitable frame 4, packing powdered glass 5 above and below the wires, and heating the whole mass in any suitable furnace (if desired, a high frequency furnace), so that the glass and wires are heated simultaneously, the glass melting around the wires, then stretching both the glass and wires while the glass is in a plastic state. This stretching will elongate the glass and the wires, and simultaneously bring the wires closer together. By cutting the elongated glass into sections and repeating the heating and stretching process numerous times, the wires will be made extremely thin and be brought closer and closer together to give the desired number per inch. During this process of manufacture, the glass sections can be joined at their side edges to provide a wider section, which in turn may, after further stretching, be again joined at its side edges to other similar sections. Where it is desired to employ a polarizing body of such embedded conducting wires for optical correction purposes, the glass body with its embedded wires can either be shaped while heated first to the desired general form, and then ground to give the desired curves, or else the grinding of the curves can be made from a planar polarizing blank, provided the embedded wires do not protrude from the surfaces of the glass. It is preferred, though not essential, that the temperature coefficient of expansion of the wires be not greatly different from that of the surrounding glass.

Figure 3:
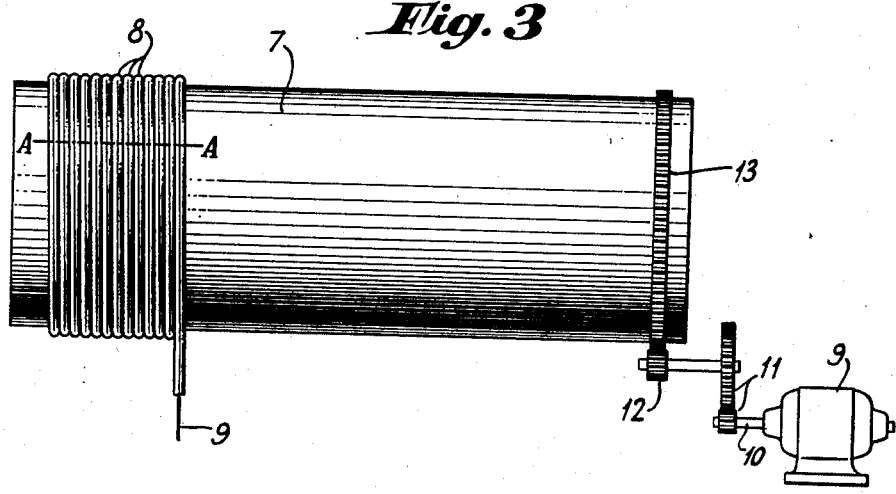

Another and a preferred method of manufacturing my new light polarizing body is shown in Fig. 3. The fine wire (preferably platinum) is first passed through glass tubing 8 having a relatively low melting point, and the glass tubing 8 and enclosed wire closely wound over a hollow drum 7, as shown. Drum 7 may be made of some ceramic material. The drum may be slowly revolved by means of a suitable low speed motor 9 whose shaft 10 is linked through reduction gears 11 to a pinion 12, in turn engaging a ring gear 13 attached to one end of the drum 7. Drum 7 is heated in any suitable manner, such as by a flame, not shown, in the interior thereof so that the adjacent turns of glass tubing 8 and embedded wires fuse into an integral mass. It is preferred that the drum 7 be relatively large, so that the glass tubing has a comparatively small radius of curvature as it is wound around the drum. If the type of glass tubing employed is such that it does not bend very readily, then either the glass tubing or the drum should be preheated to a temperature sufficient to enable bending of the tubing around the drum. If the drum 7 is preheated, then the temperature thereof should be raised for fusing the glass and wires into an integral mass after the tubing is wound around the drum.

After the closely wound turns of glass tubing 8 and their wires are fused into an integral mass, the drum is permitted to cool somewhat, and the resulting glass and wire mass is cut along a line A—A parallel to the axis of the drum, after which the glass and wires are stretched while the glass is still in a plastic state. Since the wires are substantially parallel, the stretching operation will elongate the glass and the wires, simultaneously bringing the wires closer together and forming a relatively thin ribbon. This resulting ribbon of glass with embedded parallelly arranged wires is, in turn, wound on the drum in the same manner as the glass tubing was previously wound on the drum, and the process of fusing, cutting and stretching repeated, as above. This process can be repeated as often as desired in order to obtain a polarizer of a desired size having a required number of wires per inch. It is a relatively simple matter to obtain a polarizer by this particular method of manufacture, which has 40,000 or more wires arranged parallel to one another and embedded in the glass.

An advantage of using a polarizing body having embedded wires, is that the body itself forms the lens without any need for sandwiching same between glass blanks, as heretofore required when a film is employed.

Although glass has been mentioned as the preferred transparent optical element for the light polarizing body, it should be understood that my polarizing body is not limited to the use of glass, since other transparent optical materials made from plastics, in contradistinction to glass, may be employed in connection with embedded parallel wires to form my polarizing body.

Moreover, the methods of manufacturing my light polarizing body are not limited to the precise steps outlined above, since various departures may be made in the processes without departing from the spirit and scope of the invention. For example, instead of passing the fine wire through a glass tubing, the glass tubing can be formed around the wire during the final process of making the fine wire.

It should be further understood that the light polarizing body of the invention may be used wherever there is need for such a body. For example, my new polarizing body may be used in spectacles, as a window, in headlights, in vehicle windshields, in microscopes, as an analyzer in strain detection systems, etc.

Throughout the specification and claims, the expression "stretch" will be deemed to include any elongation of the material to effect an alteration in the positioning of the embedded wires, or a contraction of the material to effect the same purpose, or a combination of the two actions.

What is claimed is:

1. A light-polarizing body comprising a transparent, fusible material having embedded therein a plurality of substantially parallel, minute, metallic, wire-like elements, adjacent ones of said elements being spaced from each other by distances not exceeding .5 micron, there being in excess of 40,000 of said elements per inch measured in a direction at right angles to the direction of alignment of said elements.

2. A light-polarizing body comprising a transparent, fusible material having embedded therein a plurality of substantially parallel, minute, metallic, wire-like elements, each of said elements being of substantially a greater length than diameter, each of said elements having a diameter less than the wave length of light in the visible spectrum, there being in excess of 40,000 of said elements per inch measured in a direction at right angles to the long dimensions of said elements.

3. A light-polarizing body comprising a transparent sheet having embedded therein a multiplicity of substantially parallel, wire-like elements, each of said elements having a diameter not exceeding .5 micron, each of said elements being of much greater length than diameter, adjacent ones of said elements being spaced from each other by distances exceeding .1 micron but not exceeding .5 micron, there being at least approximately 40,000 of said elements per inch measured in a direction at right angles to the long direction of said elements.

4. A light-polarizing body comprising a transparent sheet of glass having embedded therein a multiplicity of substantially parallel, wire-like elements, each of said elements having a diameter not exceeding .5 micron, each of said elements being of much greater length than diameter, adjacent ones of said elements being spaced from each other by distances exceeding .1 micron but not exceeding .5 micron, there being at least approximately 40,000 of said elements per inch measured in a direction at right angles to the long direction of said elements.

CHARLES H. BROWN.